(12) United States Patent
Gao et al.

(10) Patent No.: US 11,290,236 B2
(45) Date of Patent: *Mar. 29, 2022

(54) METHODS AND APPARATUSES FOR REFERENCE SIGNAL TRANSMISSION AND RECEIVING

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,798

(22) Filed: Aug. 14, 2020

(65) Prior Publication Data

US 2020/0374078 A1    Nov. 26, 2020

Related U.S. Application Data

(63) Continuation of application No. 16/235,044, filed on Dec. 28, 2018, which is a continuation of application No. PCT/CN2017/070302, filed on Jan. 5, 2017.

(51) Int. Cl.
*H04L 5/00* (2006.01)
(52) U.S. Cl.
CPC .......... *H04L 5/0048* (2013.01); *H04L 5/0057* (2013.01); *H04L 5/0064* (2013.01)
(58) Field of Classification Search
CPC .... H04L 5/0048; H04L 5/0057; H04L 5/0064
See application file for complete search history.

(56) References Cited

U.S. PATENT DOCUMENTS

2012/0270585 A1    10/2012   Feng
2012/0275428 A1    11/2012   Feng
(Continued)

FOREIGN PATENT DOCUMENTS

CN         102340382 A      2/2012
CN         103428863 A     12/2013
(Continued)

OTHER PUBLICATIONS

Qualcomm Incorporated, "Views on CSI-RS", 3GPP TSG-RAN WG1 #87, R1-1612048, Nov. 14-18, 2016, pp. 1-6 (total 6 pages).
(Continued)

*Primary Examiner* — Peter P Chau

(57) ABSTRACT

Embodiments relate to reference signal transmission and receiving in a wireless communication system A common reference signal sequence is generated based on a frequency range configuration at network side, the common reference signal sequence being shared by at least some of terminal devices respectively allocated with their own reference signal transmission configurations. The common reference signal sequence and sequence configuration information is transmitted to a terminal device, the sequence configuration information indicating a parameter by which a reference signal sequence transmitted for the terminal device can be obtained. A reference signal sequence solution with a low complexity is proposed for the wireless communication system with dynamic bandwidth allocation and/or configurable reference signal pattern, wherein only one common reference signal sequence is generated and shared by at least some of terminal devices, irrespective of reference signal transmission configurations like bandwidth allocation and/or reference signal pattern configuration.

20 Claims, 11 Drawing Sheets

(56) References Cited

U.S. PATENT DOCUMENTS

| | | |
|---|---|---|
| 2012/0320778 A1 | 12/2012 | Lv |
| 2013/0170441 A1 | 7/2013 | Sorrentino |
| 2013/0301452 A1 | 11/2013 | Yoon |
| 2014/0086093 A1 | 3/2014 | Liu |
| 2014/0241303 A1 | 8/2014 | Yoon |
| 2015/0085793 A1 | 3/2015 | Luo |
| 2015/0110059 A1 | 4/2015 | Bai |
| 2015/0189677 A1 | 7/2015 | Han et al. |
| 2015/0237518 A1* | 8/2015 | Seo .................. H04L 5/0007 455/452.1 |
| 2017/0302489 A1 | 10/2017 | Lindbom |
| 2017/0325237 A1 | 11/2017 | Sun |
| 2018/0041259 A1 | 2/2018 | Kim |
| 2018/0254868 A1 | 9/2018 | Saito et al. |

FOREIGN PATENT DOCUMENTS

| | | |
|---|---|---|
| EP | 3 242 518 A1 | 11/2017 |
| WO | 2013/085451 A1 | 6/2013 |
| WO | 2018/049035 A1 | 3/2018 |
| WO | 2018/084571 A1 | 5/2018 |

OTHER PUBLICATIONS

Nokia et al., "On considerations for NR DM-RS for data channels", 3GPP TSG-RAN WG1#87, R1-1612857, total 14 pages.

Ericsson, "On phase tracking in DFT-S-OFDM waveform", 3GPP TSG-RAN WG1#87, R1-1612338, Nov. 14-18, 2016, total 2 pages.

Ericsson, "Design considerations for phase noise tracking RS (PTRS)", 3GPP TSG-RAN WG1 #87, R1-1612333, Nov. 14-18, 2016, total 4 pages.

Intel Corporation, "Wide bandwidth support in NR", 3GPP TSG RAN WG1 Meeting #87, R1-1611958, Nov. 14-18, 2016, total 4 pages.

Panasonic, "Discussion on frequency domain frame structure for NR", 3GPP TSG RAN WG1 Meeting #87, R1-1611892, Nov. 14-18, 2016, total 5 pages.

3GPP TS 36.211 V14.1.0 Technical Specification, "3rd Generation Partnership Project; Technical Specification Group Radio Access Network; Evolved Universal Terrestrial Radio Access (E-UTRA); Physical channels and modulation (Release 14)", Dec. 2016, 175 pages total.

InterDigital Communications, "A Framework for Initial Access for NR", 3GPP TSG-RAN WG1 #86bis R1-1610351, Lisbon, Portugal, Oct. 10-14, 2016, 4 pages total.

Intel Corporation, "Discussion on DM-RS design for NR", 3GPP TSG RAN WG1 Meeting #86bis R1-1610429, Lisbon, Portugal, Oct. 10-14, 2016, 7 pages total.

Huawei, HiSilicon, "Discussion on resource allocation and indication on NR", 3GPP TSG RAN WG1 Meeting #87 R1-1611661, Reno, Nevada, USA, Nov. 14-18, 2016, 4 pages total.

Ericsson, "On DL and UL CPE compensation in MIMO", 3GPP TSG-RAN WG1 #87 R1-1612334, Reno, USA, Nov. 14-18, 2016, 4 pages total.

Communication dated Nov. 26, 2019, from the Japanese Patent Office in counterpart application No. 2019-536894.

Nokia et al., "On reference symbol types in NR", 3GPP TSG-RAN WG1#87, R1-1612854, Nov. 14-18, 2016, total 4 pages.

Communication dated Dec. 17, 2019 from European Patent Office in counterpart EP Application No. 17889870.6.

Written Opinion for PCT/CN2017/070302 dated Sep. 30, 2017.

International Search Report for PCT/CN2017/070302, dated Sep. 30, 2017.

Office Action dated Sep. 20, 2020 in Indian Application No. 201917026614.

Office Action dated Oct. 5, 2020 in European Application No. 17889870.6.

Communication dated Jun. 2, 2021 by the German Patent Office in German Application No. 11 2017 003 035.8.

* cited by examiner

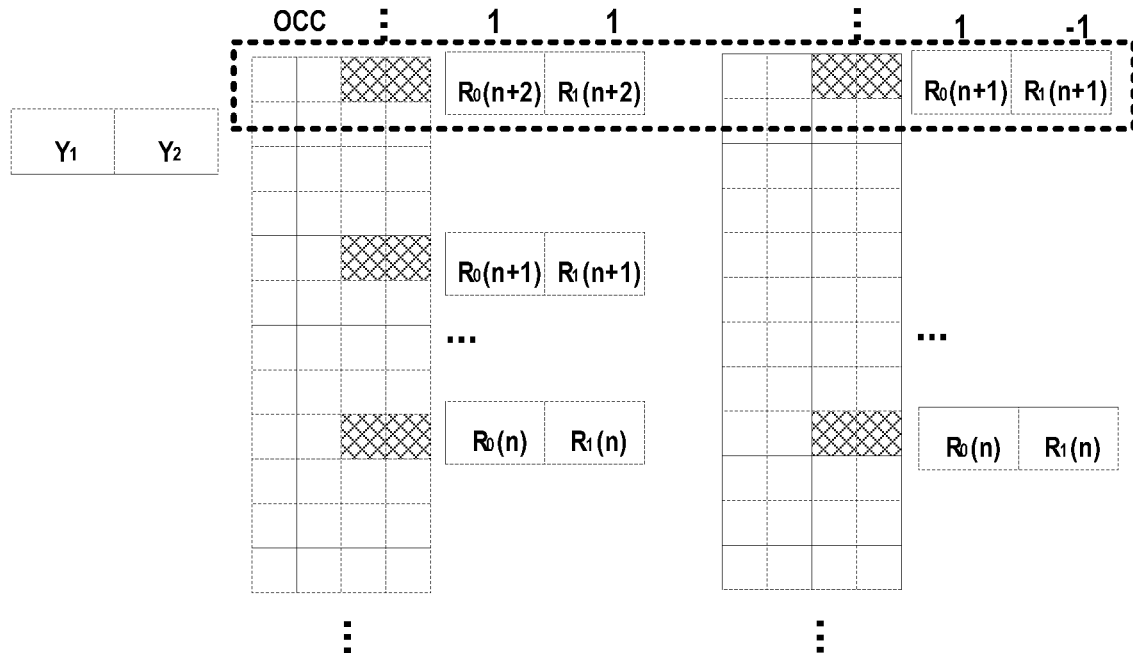

Generating, based on a frequency range configuration at network side, a common reference signal sequence shared by at least some of terminal devices respectively allocated with their own reference signal transmission configurations — 401

Transmitting the common reference signal sequence and sequence configuration information to a terminal device, the sequence configuration information indicating a parameter by which an initial reference signal sequence transmitted for the terminal device can be obtained — 402

Fig. 4

Different density/SCS for UE

Different configurations in time domain, UE obtains needed sequence from the common one.

Different band allocations in frequency domain and different configurations in time domain Example 1-Varying within several subcarriers Example 2-Varies within several symbols Example 3- Varing within a time-frequency block without shift Example 1 - Different densities in different symbols Example 2 - Different densities and offset in different symbols

METHODS AND APPARATUSES FOR REFERENCE SIGNAL TRANSMISSION AND RECEIVING

FIELD OF THE INVENTION

The non-limiting and exemplary embodiments of the present disclosure generally relate to the field of wireless communication techniques, and more particularly relate to methods and apparatuses for reference signal transmission and receiving in a wireless communication system.

BACKGROUND OF THE INVENTION

New radio access system, which is also called as NR system or network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, ultra reliable and low latency communications.

Initial work of the study item should allocate high priority on gaining a common understanding on what is required in terms of radio protocol structure and architecture with focus on progressing in the following areas:

Fundamental physical layer signal structure for new RAT
Waveform based on OFDM, with potential support of non-orthogonal waveform and multiple access
FFS: other waveforms if they demonstrate justifiable gain
Basic frame structure(s)
Channel coding scheme(s)

In addition, it is also required to study and identify the technical features necessary to enable the new radio access, including:

Efficient multiplexing of traffic for different services and use cases on the same contiguous block of spectrum Furthermore, dynamic/flexible bandwidth allocation and configurable RS pattern (including density) were also agreed on in RAN1.

The dynamic/flexible bandwidth allocation means that a dynamic/flexible and UE specific bandwidth allocation shall be supported in NR. Thus, in such a case, UE will not know the whole system bandwidth at the network side, different UE might need different reference signal sequences and it is impossible to generate a shared RS sequence for UEs by using the existing RS sequence generation solution. On the other hand, the RS pattern can also be configurable (e.g. configurable density in time/or frequency domain), therefore the legacy RS sequence cannot satisfy requirements for different patterns, especially for multi-user scheduling.

SUMMARY OF THE INVENTION

In the present disclosure, there is provided a new solution for reference signal transmission and receiving in a wireless communication system, to mitigate or at least alleviate at least part of the issues in the prior art.

According to a first aspect of the present disclosure, there is provided a method of reference signal transmission in a wireless communication system. The method comprises generating, based on a frequency range configuration at network side, a common reference signal sequence shared by at least some of terminal devices respectively allocated with their own reference signal transmission configurations; and transmitting the common reference signal sequence and sequence configuration information to a terminal device, the sequence configuration information indicating a parameter by which an initial reference signal sequence transmitted for the terminal device can be obtained.

According to a second aspect of the present disclosure, there is provided a method of reference signal receiving in a wireless communication system. The method comprises receiving a reference signal sequence transmitted from network side and sequence configuration information indicating a parameter by which an initial reference signal sequence transmitted for the terminal device can be obtained; and obtaining the initial reference signal sequence for the terminal device based on the sequence configuration information.

According to a third aspect of the present disclosure, there is provided an apparatus of reference signal transmission in a wireless communication system. The apparatus comprises: a reference signal generation module and a sequence and information transmission module. The reference signal generation module is configured to generate, based on a frequency range configuration at network side, a common reference signal sequence shared by at least some of terminal devices respectively allocated with their own reference signal transmission configurations. The sequence and information transmission module is configured to transmit the common reference signal sequence and sequence configuration information to a terminal device, the sequence configuration information indicating a parameter by which an initial reference signal sequence transmitted for the terminal device can be obtained.

According to a fourth aspect of the present disclosure, there is provided an apparatus of reference signal receiving in a wireless communication system. The apparatus comprises: a sequence and signal receiving module and a sequence obtainment module. The sequence and signal receiving module is configured to receive a reference signal sequence transmitted from network side and sequence configuration information indicating a parameter by which an initial reference signal sequence transmitted for the terminal device can be obtained. The sequence obtainment module is configured to obtain the initial reference signal sequence for the terminal device based on the sequence configuration information.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, a reference signal sequence solution with a low complexity is proposed for the wireless communication system (especially for new radio access system) with dynamic bandwidth allocation and/or configurable reference signal pattern, wherein one common reference signal sequence can be generated and shared by at least some of terminal devices, irrespective of reference signal transmission configurations like bandwidth allocation and/or reference signal pattern configurations. Thus, it is possible to perform RS measurement and multi-user scheduling for UE even if they are configured different bandwidth allocation and/or configurable reference signal pattern. In addition, it can achieve a better interference cancellation since reference signals from interfering cells will be easy to be obtained. Moreover, it only needs terminal devices to generate few (for example, only one) reference signal sequence for different band allocations and/or RS pattern configurations, which means a less complex solution.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 3 schematically illustrates example potential issues associated with configurable RS pattern in the NR system;

FIG. 4 schematically illustrates a flow chart of a method for reference signal transmission according to an example embodiment of the present disclosure;

DETAILED DESCRIPTION OF EMBODIMENTS

Figure 1:
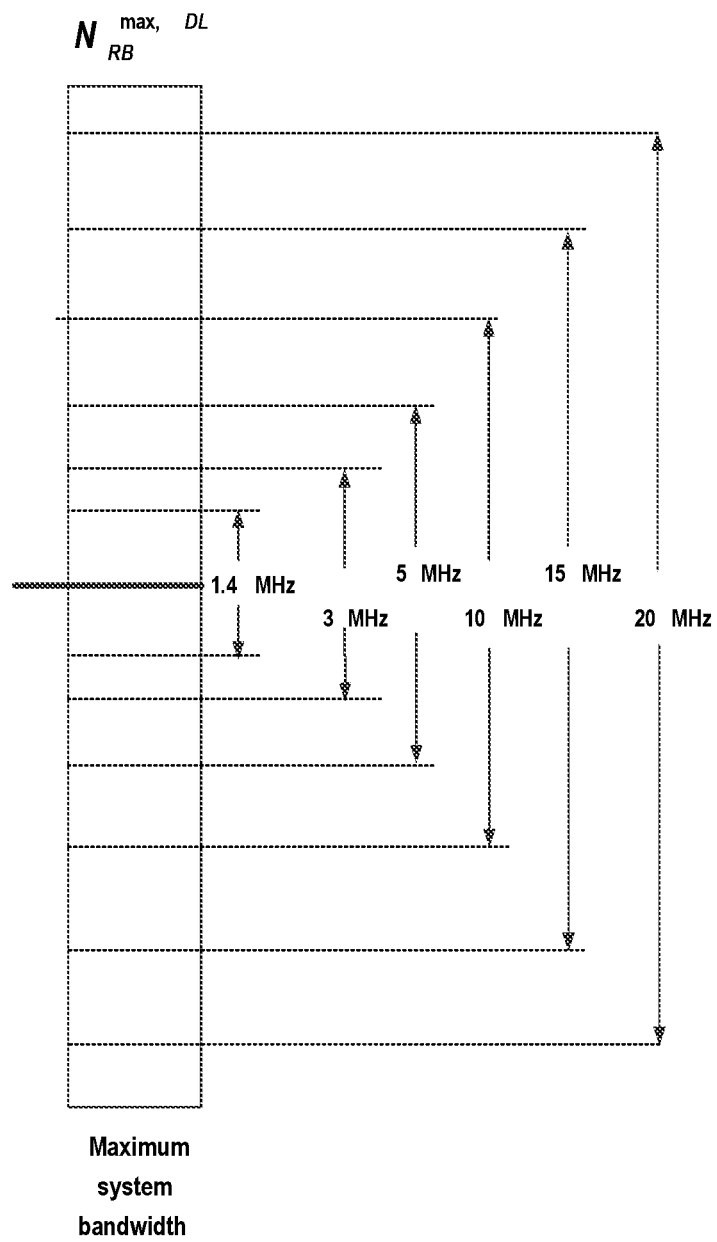
FIG. 1 schematically illustrates system bandwidth configurations in the LTE system.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (Node B in NR), a radio header (RH), a remote radio head (RRH), a relay, or a low power node such as a femto, a pico, and so on.

Hereinafter, the Channel State Information-Reference Signal (CSI-RS) sequence generation in LTE system will be first described to facilitate the understanding of embodiment of the present disclosure.

According to the CSI-RS generation in LTE, the reference-signal sequence $r_{l,n_s}(m)$ is defined by:

$$r_{l,n_s}(m) = \frac{1}{\sqrt{2}}(1 - 2 \cdot c(2m)) + j\frac{1}{\sqrt{2}}(1 - 2 \cdot c(2m+1))$$

$$m = 0, 1, \ldots, N_{RB}^{max,DL} - 1$$

where $n_s$ is the slot number within a radio frame and l is the OFDM's symbol number within the slot; c(i) is a pseudo-random sequence generated by a pseudo-random sequence generator, which shall be initialized with $$c_{init} = 2^{10} \cdot (7 \cdot (n_s+1)+l+1) \cdot 2 \cdot N_{ID}^{CSI} + 1 + 2 \cdot N_{ID}^{CSI} + N_{CP}$$

at the start of each OFDM symbol where $$N_{CP} = \begin{cases} 1 & \text{for normal } CP \\ 0 & \text{for extended } CP \end{cases}$$

and wherein the quantity $N_{ID}^{CSI}$ equals to $N_{ID}^{cell}$ unless it is configured by higher layers.

In subframes configured for CSI reference signal transmission, the reference signal sequence shall be mapped to complex-valued modulation symbols used as reference symbols on antenna port p according to $$a_{k,l}^{(p)} = w_{l''} \cdot r_{l,n_s}(m')$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Thus, it is clear that the CSI-RS sequence is generated with a fixed maximum length $N_{RB}^{max,DL}$ and the configured length $N_{RB}^{DL}$. The configured length $N_{RB}^{DL}$ is associated with configuration of system bandwidth at the network.

The index for CSI-RS sequence generation is known to UE, the $N_{RB}^{max,DL}$ is fixed to 110 and the $N_{RB}^{DL}$ can be obtained from physical broadcast channel (PBCH), and the CSI-RS is full band one. Thus, the generated CSI-RS can be shared by all UEs in the cell.

Therefore, in the LTE system, the CSI-RS sequence is generated with a fixed maximum length, and for each of six different configurations of system bandwidth as illustrated FIG. 1, which have the same central frequency, the generated CSI-RS sequence will be fixed. Thus, for the same cell ID, the CSI-RS sequence is common for all UEs in the cell.

However, things will be different in the NR system. As mentioned hereinbefore, the dynamic/flexible bandwidth allocation will be supported in NR system and thus the UE will not know the whole system bandwidth at the network side. In addition, different UE might need different reference signal sequences since they might be allocated with different frequency bands. With the existing RS sequence generation solution, it is impossible to generate a single RS sequence which can be shared for UE.

Figure 2:
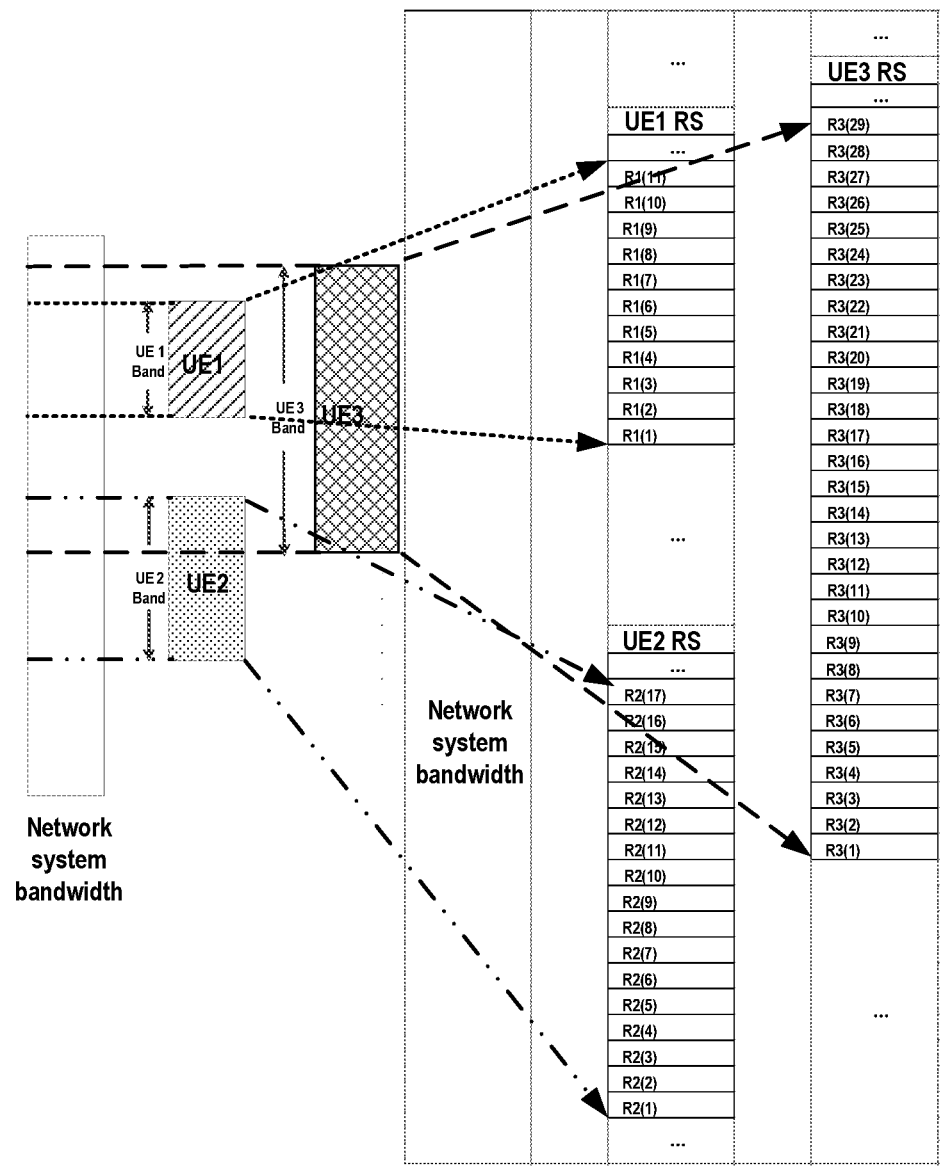
FIG. 2 schematically illustrates example potential issues associated with dynamic bandwidth allocation in the NR system.

FIG. 2 illustrates example potential issues associated with dynamic bandwidth allocation in the NR system. As illustrated in FIG. 2, there are three different UE, i.e. UE1, UE2, and UE3, which are located in the same cell but configured, for scheduling/measurement, with UE-specific frequency bands each of which is only a part of the whole system band configured at network side. The frequency bands for different UE can be separated, or partially/fully overlapped, as illustrated in FIG. 2. From UE's perspective, its whole bandwidth depends on the RF capability, and it's not mandated to know the system bandwidth at network side and thus the band allocation should be transparent.

In such a case, RS configuration with dynamic band allocation might result in some issues. For example, for the cell or beam specific RS, it shall be common or shared by a group of UEs, like RS for CSI measurement. In addition, considering multi-user MIMO scheduling, the demodulation RS should also be unified for orthogonally co-scheduling. Even for the different sequences of RS for quasi-orthogonal or for inter/intra-cell interference management, the RS sequence should be able to be known for other UEs for advanced interference cancellation. In those cases, RS configuration with the dynamic band allocation, which will not enable RS sharing, will be a problem.

In addition, in the NR system, the UE can be configured with a UE-specific RS pattern (e.g. UE-specific RS density) in time/frequency domain. In such a case, it is also impossible to share a common RS with the existing RS generation solution. However, a common RS generation might be also beneficial in many cases, especially when RS pattern is dynamically changed, since the UE can abstract the needed RS from a common sequence. Moreover, the common sequence can facilitate multi-user scheduling.

As illustrated in FIG. 3, if UE generates their RS sequences separately, the received signals on REs are $Y_1$ and $Y_2$, which will respectively be represented as follows:

$$Y_1 = H_1 * R_0(n+2) + H_2 * R_0(n+1)$$

$$Y_2 = H_1 * R_1(n+2) - H_2 * R_1(n+1)$$

$$R_0(n+2) \neq R_1(n+2) \neq R_0(n+1) \neq R_1(n+1).$$

However, in such a case, as illustrated in FIG. 3, for different RS patterns, the orthogonality cannot be guaranteed, which means that channels H1 and H2 for each UE cannot be estimated. Moreover, each UE might cause interference to others, and it's unable for advanced UE to subtract interference from other UEs. Thus, the legacy RS sequence generation cannot satisfy requirements for different RS patterns as well, especially for multi-user scheduling.

In view of the above, in the present disclosure, there is proposed a common RS sequence design solution which is irrespective of UE bandwidth or RS pattern configuration. By means of the common RS sequence design, a group of UE with their own RS transmission configurations can share a common RS sequence, such as those RS for measurement and multi-use scheduling. In addition, it may achieve a better interference cancellation as the RS from an interference cell is easy to be obtained. Moreover, UE only needs to generate a few of sequence (e.g. only one) for different band allocation/pattern configuration, which means a less complexity in RS sequence generation.

Hereinafter, reference will be made to the accompanying drawings to describe the solution for reference signal transmission and receiving as proposed herein. However, it shall be noted that these description are made only for illustration purposes and the present disclosure is not limited thereto.

Reference is first made to FIG. 4, which schematically illustrates a flow chart of a method 400 of reference signal transmission in a wireless communication system according to an embodiment of the present disclosure. The method 400 can be performed at a serving node, for example a BS, like a node B (NodeB or NB).

As illustrated in FIG. 4, first in step 401, a common reference signal sequence is generated based on a frequency range configuration at network side, the common reference signal can be shared by at least some of terminal devices respectively allocated with their own reference signal transmission configurations.

In an embodiment of the present disclosure, a common reference signal sequence is generated based on system bandwidth at network side. In other word, the length of the common reference signal sequence is determined based on at least the whole system bandwidth at network side.

Figure 5:
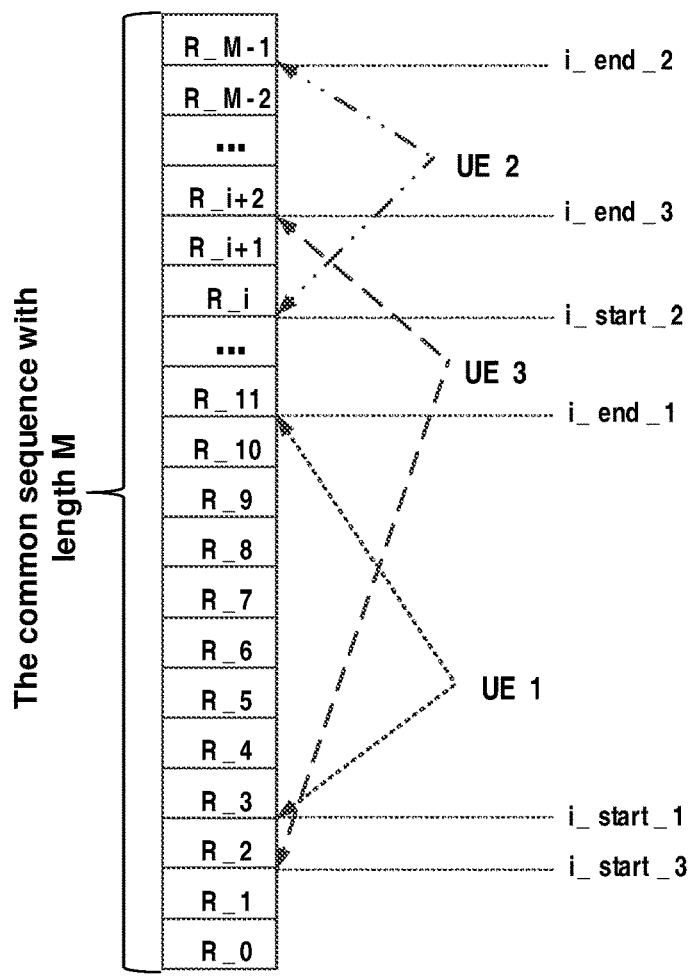
FIG. 5 schematically illustrates a common RS sequence and RS sequences for respective UE with different frequency band allocations according to an example embodiment of the present disclosure.

As illustrated in FIG. 5, the common reference signal sequence R_i is comprised of R_0, R_1, R_2, ..., R_M−2, R_M−1, wherein M is the length of the reference signal R_i and is related to at least the system bandwidth at network side. In addition, it may be also further related to the minimum subcarrier space (SCS).

The sequence R_i may be defined by a pseudo-random sequence which can be initialized by the pseudo-random sequence generator with an initial value C_init. The initial value C_init can be calculated with parameters related to at least one of slots index $n_s$, symbol index l, cell ID $N^{ID}$, UE_ID $U^{ID}$, CP type $N_{CP}$, index of SCS configuration $N_{SCS}$, link type $N_{link\_type}$ and etc. In an example embodiment of the present disclosure, the C_init can be determined as follows:

$$C\_init = a_0 \cdot n_s + a_1 \cdot l + a_2 \cdot N^{ID} + a_3 \cdot U^{ID} + a_4 \cdot N_{CP} + a_5 \cdot N_{SCS} + a_6 \cdot N_{link\_type}$$

where $a_i$ is coefficient for each factor, i=0, 1, ..., the number of parameters, $N_{SCS}$ is a parameter of subcarrier space configuration, and the value of $N_{SCS}$ can be selected from a set of values, each value corresponding to a subcarrier space; $N_{link\_type}$ is a parameter of link type which indicates the initial value is for downlink, uplink or sidelink. It shall be noticed that for the at least some of terminal device, they will be allocated with the same $U^{ID}$ and thus they can share the generated RS sequence.

In an embodiment of the present disclosure, the following table can be used for indicating the subcarrier space configurations.

TABLE 1

Example subcarrier space configurations

| $N_{SCS}$ | Subcarrier space |
|---|---|
| 0 | 15 kHz |
| 1 | 30 kHz |
| 2 | 60 kHz |
| 3 | 120 kHz |
| 4 | 240 kHz |
| 5 | 480 kHz |
| 6 | 3.75 kHz if supported |
| ... | ... |

Regarding the link type parameter $N_{link\_type}$, the following table can be used as a way to indicate the link type.

TABLE 2

Example link type indications

| $N_{link\_type}$ | Link type |
|---|---|
| 0 | Downlink |
| 1 | Uplink |

For the downlink or uplink, the RS sequence can be symmetric, and the sequence can be generated with different initial values.

Thus, with the common RS sequence with a length M as illustrated in FIG. 5, for different UE with different bandwidth configurations, for example those configured with different frequency ranges/or positions in the system frequency band, their respective RS sequences will start from different indices of the common RS sequence and have different lengths. As illustrated, the RS sequence for UE 1 may start from i_start_1 (R_3 in the common RS sequence) and end at i_end_1 (R_10 in the common RS sequence); the RS sequence for UE 2 may start from i_start_2 (R_i in the common RS sequence) and end at i_end_2 (R_M−2 in the common RS sequence); the RS sequence for UE 3 may start from i_start_3 (R_2 in the common RS sequence) and end at i_end_3 (R_i+2 in the common RS sequence). In other words, RS sequences for respective UE will correspond to their own allocated frequency bands. Herein, the start index of the RS sequence for UE is also called as the index of the RS sequence for the UE.

Reference is made back to FIG. 4, at step S402, the common reference signal sequence and sequence configuration information will be transmitted to a terminal device, the sequence configuration information indicating a parameter by which an initial reference signal sequence transmitted for the terminal device can be obtained.

The common RS sequence can be transmitted to the at least some of terminal devices and respective terminal devices will receive RS sequences for themselves at their own allocated bands respectively. However, the terminal devices also needs to know initial modulated symbols of the RS sequence (i.e., the initial RS sequence without undergoing channels) to, for example, perform channel measurement or co-scheduling. Thus, the sequence configuration information, which indicates a parameter by which an initial reference signal sequence transmitted for the terminal device can be obtained, can be transmitted to the terminal device as well. By means of the parameter carried within the sequence configuration information, the terminal device may obtain the RS sequence from a common RS sequence generated in a similar way to that described at step 401.

In an embodiment of the present disclosure, the sequence configuration information may be transmitted to the terminal devices in an explicit away. For example, the sequence configuration information may comprise sequence position information indicating a position at which the reference signal sequence for the terminal device is located in the common reference signal sequence. The sequence position information may include any of:

1) a start index and an end index of the reference signal sequence for the terminal device, i.e., i_start_ue, and i_end_ue;

2) a start index and the length of the reference signal sequence for the terminal device, i.e., i_start_ue and m_ue; and 3) an end index and the length of the reference signal sequence for the terminal device, i.e., i_end_ue and m_ue.

In addition, it can be known that different from the RS generation solution in LTE the index of the RS sequence for the terminal device is not corresponding to the index of the frequency band. In such a case, it is also possible to send an offset value relative to the frequency configuration of the terminal device to the terminal device. The offset value indicates the offset of the index of the RS sequence for the terminal device with regard the index of the frequency band allocated to the terminal device. In another embodiment of the present disclosure, it is also possible to send an offset value relative to a fixed frequency position. In such a way, the terminal device can know how to obtain its RS sequence as well.

In another embodiment of the present disclosure, it may also send the length M of the common RS sequence to the UE.

In another embodiment of the present disclosure, it is also possible to transmit the sequence configuration information implicitly. In other word, the sequence configuration information can be implicitly indicated from other parameters. Examples of these parameters may include, but not limited to boundaries/length of frequency band allocated to the terminal device, frequency band configuration of the terminal device, a sequence generation initial value for the terminal device.

As described hereinbefore, the RS sequence for the terminal device is corresponding to its own allocated bandwidth and thus the boundaries/length of frequency band allocated to the terminal device can be used to indicate the sequence configuration information implicitly. In addition, if a terminal device's band is selected from a predefined group of bands with predetermined indication values, by means of the frequency band configuration, the terminal device can learn the allocated frequency band from the predetermined value and thus obtain the sequence configuration information. Besides, it is also possible to transmit to the terminal device a sequence initialization value C_init_ue, from which the terminal device could generate its RS sequence by itself. The C_init_ue is specific to the terminal device but originated from the C_init for the common RS sequence, and thus it will make symbols of RS sequence for different terminal devices same at the same frequency or time position.

It shall be noticed that, although hereinbefore, the present disclosure is described with embodiments wherein the common RS sequence is generated based on the system bandwidth at network side, the present disclosure is not limited thereto. In an embodiment of the present disclosure, the common RS sequence can be generated based on the frequency band configured for a node serving the terminal device instead of the whole system bandwidth. It can be appreciated that different serving nodes may be allocated different frequency bandwidth and in such a case, it is also possible for the network to generate a common RS sequence corresponding to its allocated frequency bandwidth.

For example, for different frequency range configurations, the start index for RS sequence generation may be different. However, in such a case, the common reference signal sequence can be generated based on a frequency range covering all possible frequency ranges of the different frequency range configurations. in such a case, it will make ensure that the RS sequences for different frequency range configurations have the same value at the same frequency positions.

Figure 6:
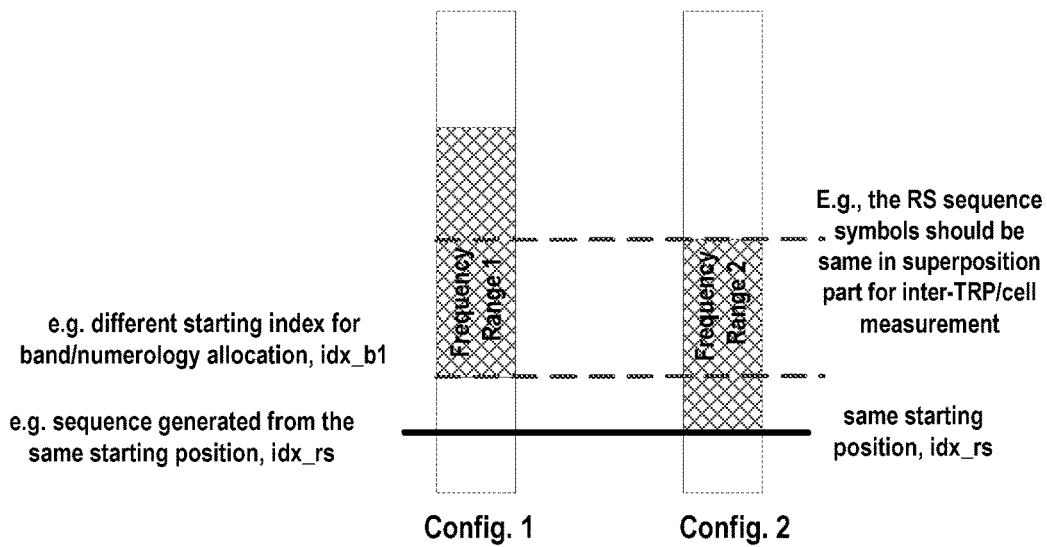
FIG. 6 schematically illustrates an example common RS sequence generation according to another embodiment of the present disclosure.

For example, as illustrated in FIG. 6, there are two different frequency range configurations, frequency range 1 and frequency range 2. In other words, the two transmission and reception points (TRPs)/cells or two configurations of one cell are configured with different frequency band/or numerology allocations. If the UE needs to measure inter-TRP/cell interference, the RS sequence should be same in some region (e.g., for the superposition part). In this case, it is possible to generate the common sequence from the same starting position idx_rs, which is corresponding to the lower boundary of the two frequency ranges.

For each UE, the index idx_rs for RS generation can be indicated to the UE, and the offset value k with regard to the idx_rs can be also indicated to the UE. In such a case, the UE can determine the start index for its RS sequence as, for example, idx_rs1=idx_rs+k. Or alternatively, the start index idx_b1 for band/numerology allocation for UE, which is independent from idx_rs, can be indicated to the UE. The RS sequence for two different frequency range configurations can be obtained from the common RS sequence generated from idx_rs. The RS sequence parameters (e.g. for serving cell and neighbor cell) can be indicated to the UE. The parameters may include at least one of starting index, length, ending index, offset value, numerology, etc.

In an embodiment of the present disclosure, the different frequency range configurations can have at least one of different subcarrier spacing configurations and different cyclic prefix configurations.

In an embodiment of the present disclosure, a fixed index can be used for RS sequence generation for different numerologies. The index can be detected by UE, e.g. by synchronization signals. In other word, for numerology in different numerology configurations, the common reference signal sequence can be generated based on a frequency range covering all possible frequency range of the numerology; and a fixed index and an offset value with regard to the fixed index can be used to indicate the sequence configuration information.

Figure 7:
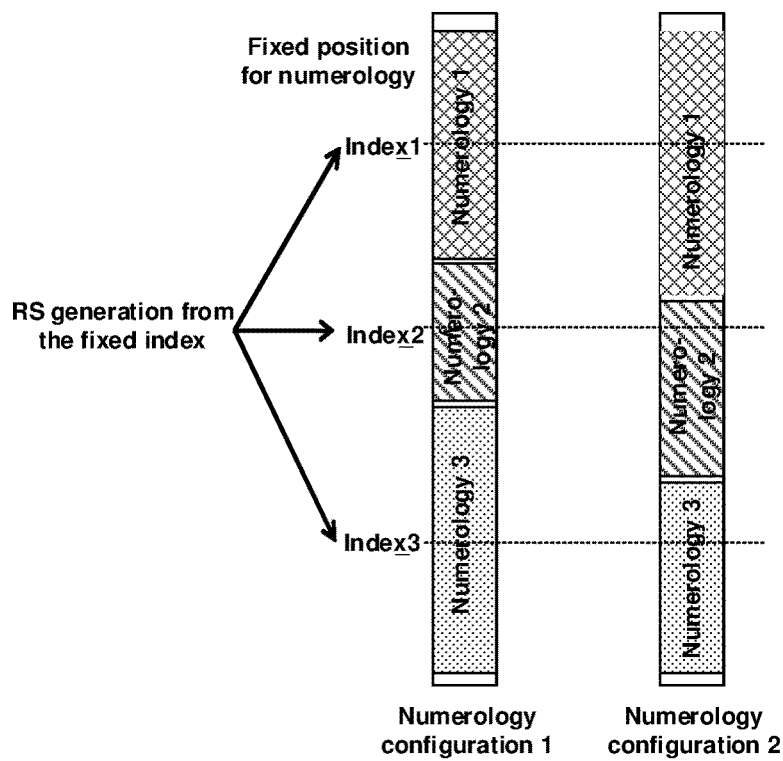
FIG. 7 schematically illustrates an example common RS sequence generation with a fixed index according to a further embodiment of the present disclosure.

FIG. 7 illustrates an example common RS sequence generation with a fixed index according to an embodiment of the present disclosure. As illustrated, for different numerology configurations containing for example three numerologies, for each of numerologies 1, 2, and 3 in these numerology configurations, the common RS sequence generation can use the fixed index, i.e., index 1, 2 or 3 respectively. That is to say, a common RS sequence generation is generated based on a frequency range covering all possible frequency range of the numerology, and a fixed index and an offset value are used as the sequence configuration information. In such a way, it is possible to keep the reference signal same in the same frequency position.

Figure 8:
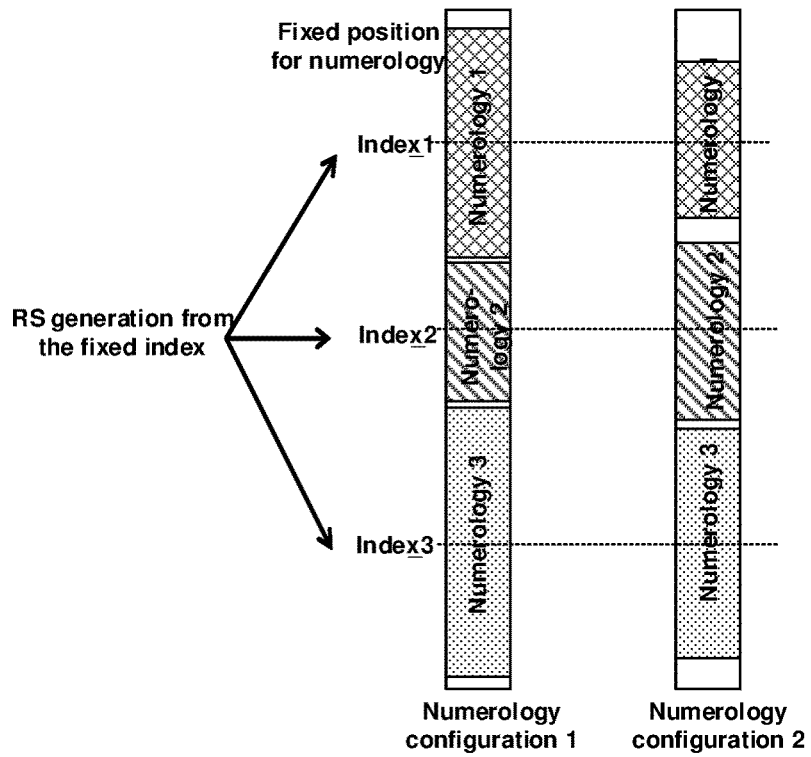
FIG. 8 schematically illustrates an example common RS sequence generation with a fixed index according to a still further embodiment of the present disclosure.

FIG. 8 illustrates an example common RS sequence generation with a fixed index according to another embodiment of the present disclosure. The solution is substantially similar to that in FIG. 7 but different in that the index is fixed at the central position of each frequency range. That is to say, all the frequency ranges have the same central frequency position.

In another embodiment of the present disclosure, the index for RS sequence generation for different numerologies can be configured by network.

Hereinafter, the present disclosure is described mainly with reference to dynamic bandwidth allocation but the present disclosure is not limited there to. The present disclosure can also be used in configurable RS pattern, which may include at least one of a reference signal density configuration in time domain, a reference signal density configuration in frequency domain and a reference signal frequency offset configuration. In such a case, it will be advantageous if the common reference signal sequence is generated further based on a whole set of resource elements used for RS transmission in different reference signal configurations.

Figure 9:
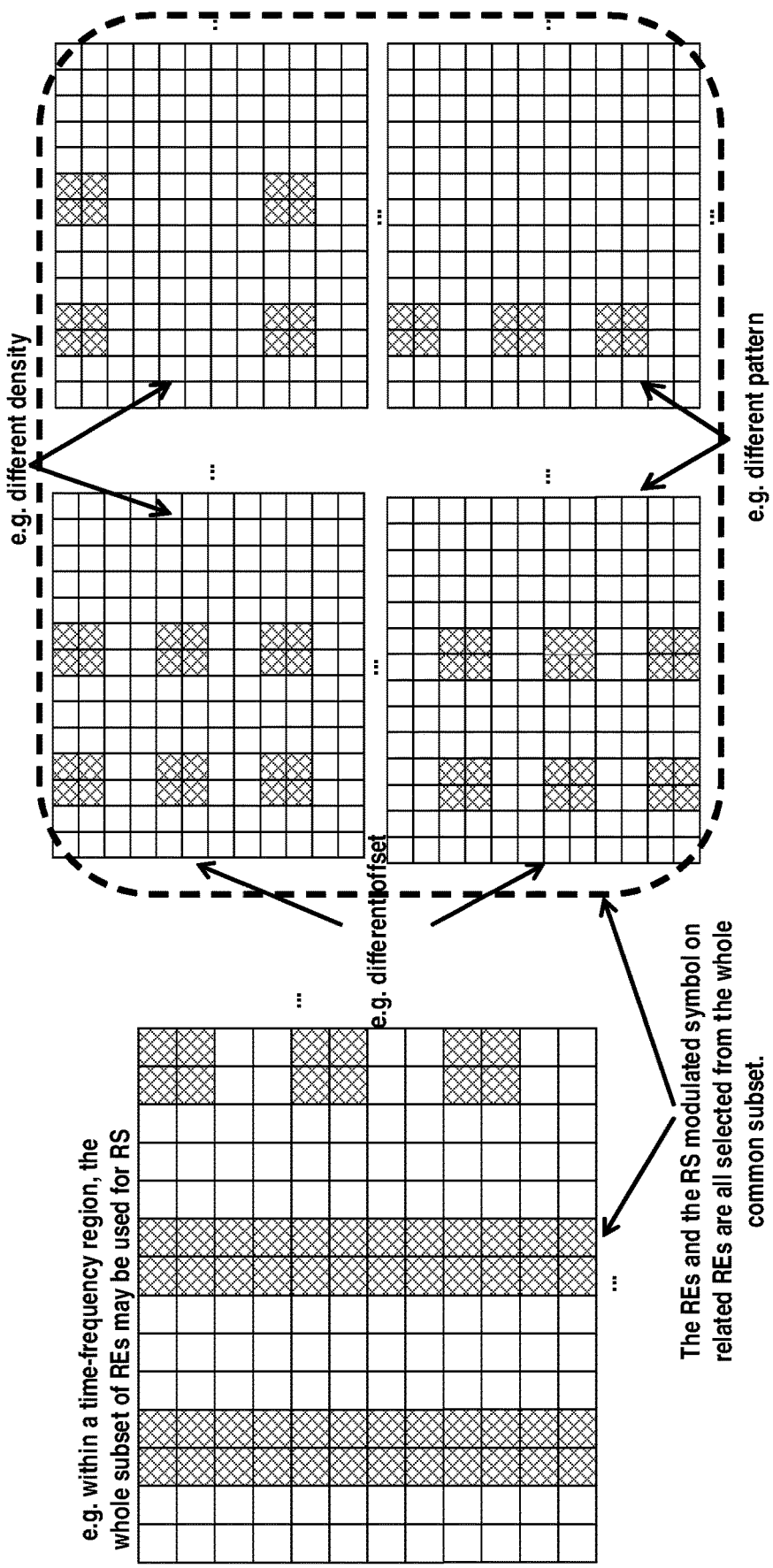
FIG. 9 schematically illustrates an example common RS sequence for UE with configurable RS patterns according to a still further embodiment of the present disclosure.

As illustrated in FIG. 9, the RS pattern is nested in time-frequency domain and if the configurable RS pattern is supported in NR system, there might be various RS patterns, those with different offsets, with different densities, with/without additional transmission, etc., as those illustrated in right figure in FIG. 9. In such a case, it may obtain a whole set of resource elements used for RS transmission in different RS configurations as illustrated in the left figure in FIG. 9, and thus REs and modulated symbols on related REs can all be selected from the whole set. Then, it is possible to generate a common RS sequence further based on a whole set of resource elements used for RS transmission in different reference signal configurations. Accordingly, a RS sequence for a RS pattern of a terminal device can be obtained from the common RS sequence:

With the common RS sequence generated based on the whole set of resource elements used for RS transmission in different reference signal pattern configurations, for UE with different RS patterns such as different densities, their respective RS sequences will be obtained the common RS sequence.

Figure 10:
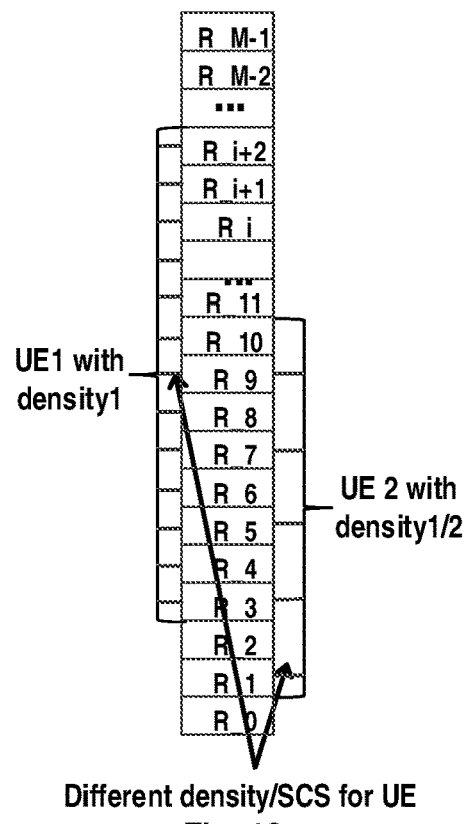
FIG. 10 schematically illustrates a common RS sequence and RS sequences for respective UE with different RS densities according to an embodiment of the present disclosure.

FIG. 10 schematically illustrates a common RS sequence and RS sequences for respective UE with different RS densities according to an embodiment of the present disclosure. As illustrated, the common RS sequence has a length M, thus the sequence can be represented by R_i, i=0, 1, ..., M−1. For UE configured with different densities, the density configuration can be informed to the UE. For different density configurations, UE can abstract the needed sequence from the common sequence R_i. For example, for UE with a density of 1, the sequence therefor is R_i, i=0, 1, ..., M−1, while for UE with a density of ½, the sequence thereof is R_i, i=0, 2, 4 ... 2·⌊(M−1)/2⌋, or R_i=1, 3, 5 ...

Similarly, for different SCS configurations, UE can also abstract the needed sequence from the common sequence.

For example, the UE with maximum density or minimum SCS $k_0$, the sequence is R_i, i=0, 1, ..., M−1; while for UE with density 1/K or SCS K*$k_0$, the sequence can be expressed as $$R\_i, i = i_{start}, i_{start}+K+o, i_{start}+2 \cdot K+o, \ldots, i_{start}+l \cdot K+o,$$
$$i_{end} \; l=0,1,2 \ldots$$

where i_start is the start index of the sequence, i_end is the end index of the sequence, K is parameter of density (for ½ density configuration, K=2), or parameter of SCS (K·$k_0$, wherein the reference SCS is $k_0$), o is offset configuration. These parameters can be configured separately or together. The reference SCS $k_0$ can be configured by network. For example, for some network, the reference SCS is 15 kHz, 30 kHz, 60 kHz, 120 kHz or 240 kHz.

In an embodiment of the present disclosure, for different symbol/slots, the RS sequence can be same or generated with different initial values.

In another embodiment of the present disclosure, the RS sequence can be generated for a time-frequency region. The reference density in one PRB in frequency domain can be denoted by $d_0$ (e.g. maximum density), the reference SCS can be denoted by $k_0$ (e.g. minimum SCS), the reference density in time domain can be denoted by to (e.g. maximum density), the number of PRB (with reference SCS $k_0$) can be denoted by N, the length in one symbol in the whole bandwidth can be denoted by L (e.g. L=N*$d_0$), and the maximum length of the sequence can be denoted by M (e.g. M=L*$t_0$). The common sequence is R_i, i=0, 1, ..., M−1. For UE with different configurations, it can abstract needed sequence from the common RS sequence.

Figure 11:
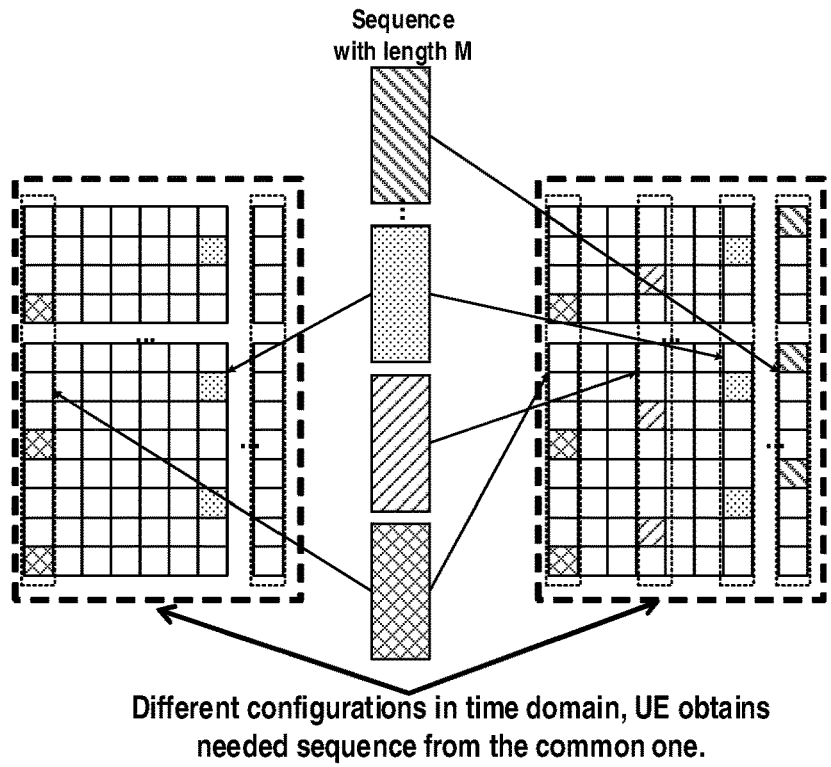
FIG. 11 schematically illustrates a common RS sequence and RS sequences for respective UE with different RS configurations in time domain according to another example embodiment of the present disclosure.

For UE configured with different SCS ki, its RS sequence can be abstracted every ki/$k_0$, similar to the case as illustrated in FIG. 10. For UE configured with different densities di in frequency domain, its RS sequence can be abstracted from the common RS sequence every di/$d_0$, also similar to the case as illustrated in FIG. 10. For UE configured with different time densities ti, its RS sequence can be abstracted from a RS sequence group, as illustrated in FIG. 11. For UE configured with different patterns, its RS sequence can be just abstracted from the common RS sequence accordingly.

Figure 12:
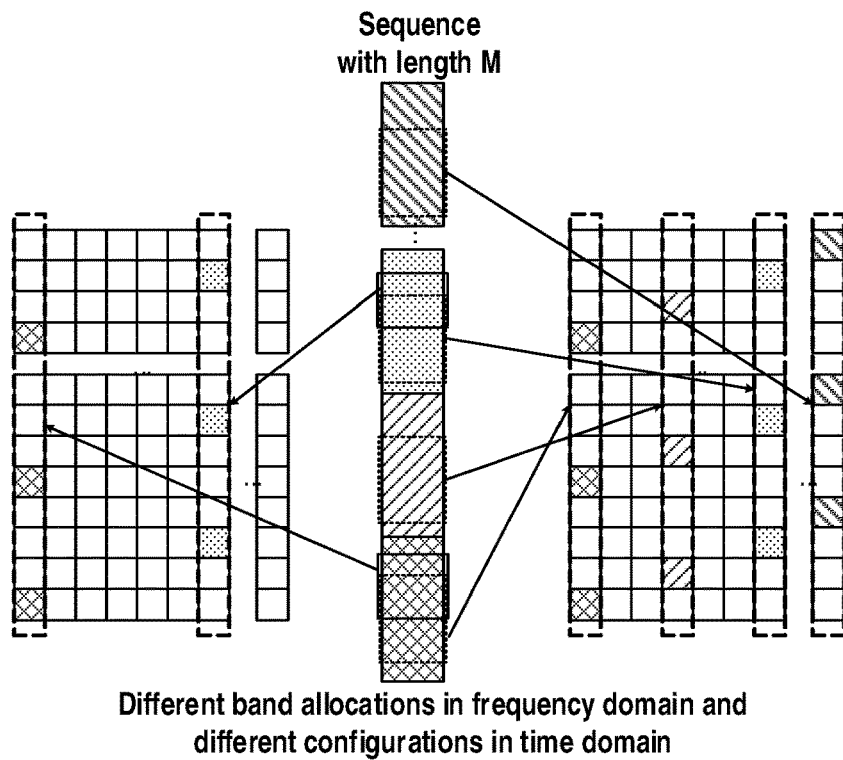
FIG. 12 schematically illustrates a common RS sequence and RS sequences for respective UE with different band allocations in frequency domain and different RS configurations in time domain according to another example embodiment of the present disclosure.

For UE configured with different patterns in time domain and different band allocations in frequency domain, their respective RS sequences can be just abstracted from the common RS sequence corresponding to their band allocations and their RS patterns as illustrated in FIG. 12.

In an embodiment of the present disclosure, RS modulated symbols in one symbol and one PRB can be similar and then the RS sequence for UE with different densities in frequency domain can be easily obtained.

In another embodiment of the present disclosure, modulated symbols in the common reference signal sequence vary by any of: a time-frequency block; a predetermined number of subcarriers in frequency domain; and a predetermined number symbols in time domain.

Figure 13:
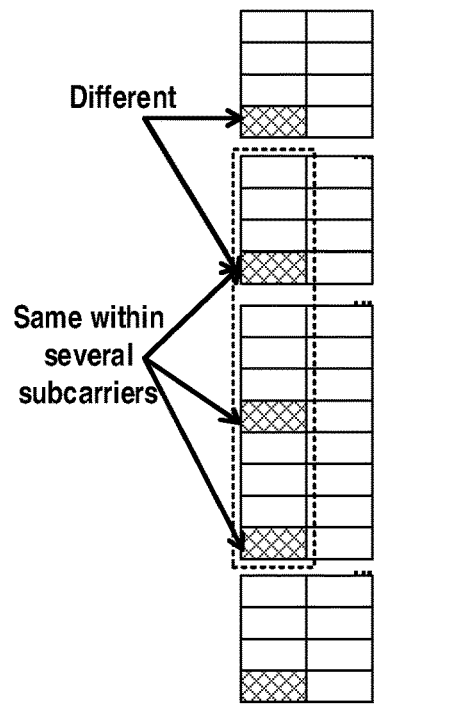
FIGS. 13 to 15 schematically illustrates different varying modes of modulated symbols in the RS sequence according to embodiments of the present disclosure.

As illustrated in FIG. 13, the modulated symbols in the common RS sequence can vary by a predetermined number of subcarriers in the frequency domain. That is to say, within these subcarriers, modulated symbols can be same but may be different from modulated symbols in another predetermined number of subcarriers.

Figure 14:
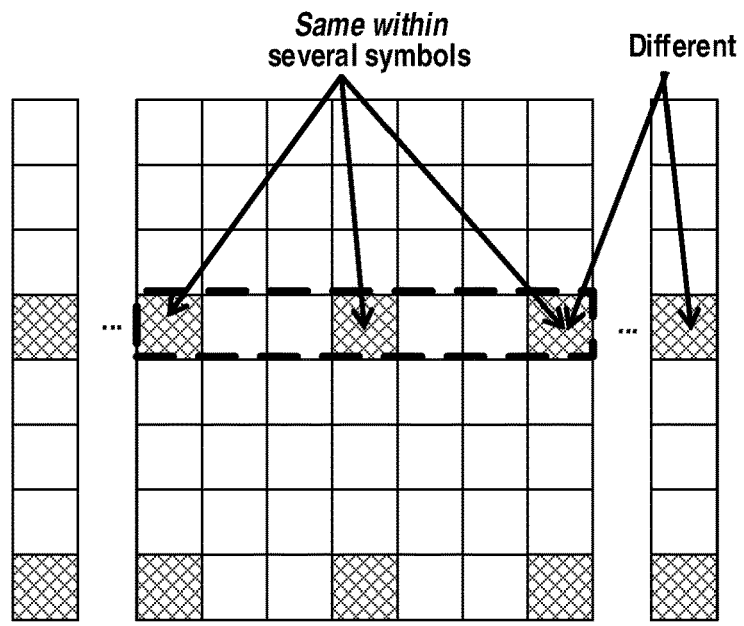

As an alternative, as illustrated in FIG. 14, modulated symbols in the common RS sequence can vary by a predetermined number of symbols in the time domain. That is to say, modulated symbols in the predetermined number of symbols will be same but may be different from another predetermined number of symbols.

Figure 15:
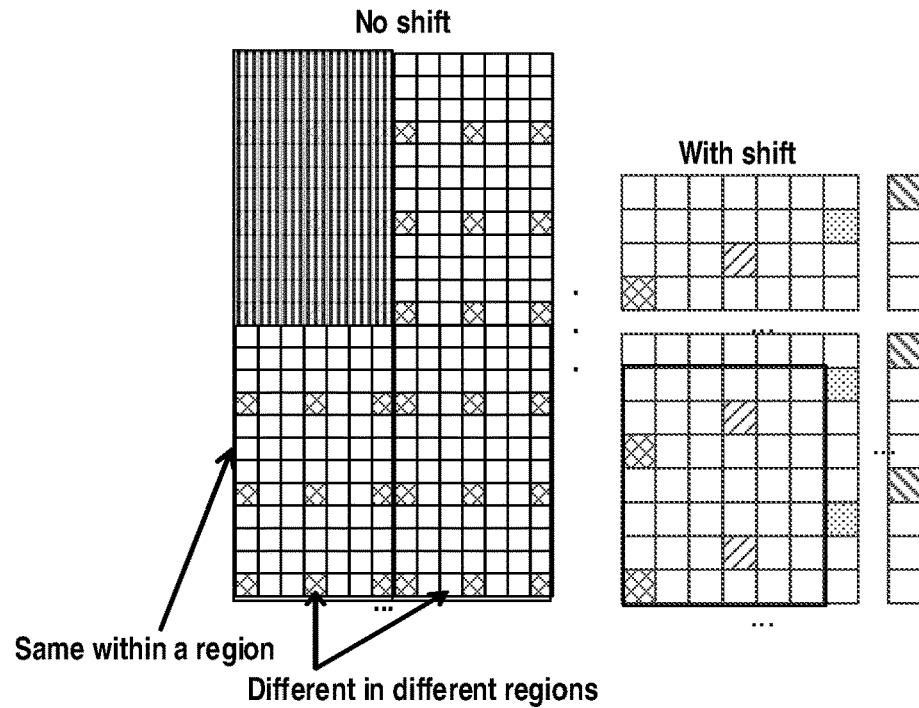

In addition, modulated symbols in the common RS sequence can also vary by a time-frequency block, as illustrated in FIG. 15. That is to say, within the same time-frequency block, modulated symbols will be same but different from another time-frequency blocks. The time-frequency blocks may have no frequency shift there between as illustrated at left side in FIG. 15 or have a predetermined frequency shift as illustrated at right side in FIG. 15.

Figure 16A:
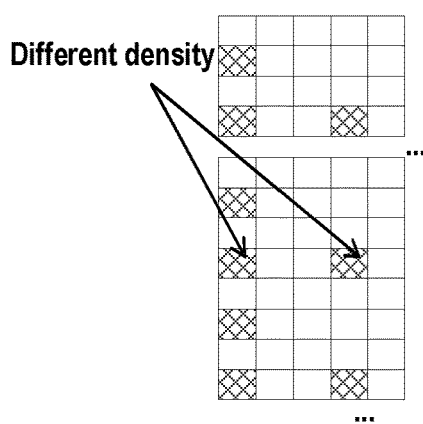
FIGS. 16A and 16B schematically illustrates common RS sequence generation for symbols with different densities according to an embodiment of the present disclosure.
Figure 16B:
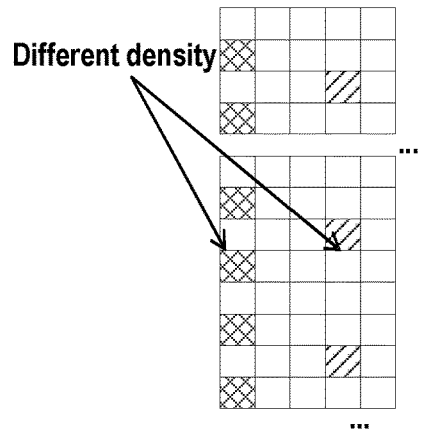

In addition, the density for one RS in different symbols can be different as illustrated in FIG. 16A (with no offset) and FIG. 16B (with offset). In such a case, there might be several options. In the first option, the RS sequence may be generated for the first symbol containing RS, and the modulated symbols in following symbols can be generated based on the first one in the same frequency position. for example are same as or multiplied by a frequency offset (a complex value) with the first one in the same frequency position. In a second option, one common RS sequence is generated for a time-frequency block, and modulated symbols on different symbols can be abstracted from the common RS sequence. In a third option, it may initialize the RS sequence for each symbol.

In NR system, phase tracking RS (PT-RS) is introduced, which is a reference signal used for tracking phase noise or frequency offset and were agreed in RAN1 #87 meeting. According to the agreement in RAN1 #87 meeting, the density of PT-RS in frequency domain can be rather spare. In such a case, the sequence of PT-RS can be generated based on a previous DMRS in the same frequency position. That is to say, the PT-RS may be same as or multiplied with frequency offset (a complex value) with the previous DMRS in the same frequency position. Alternatively, it is also possible to generate the sequence of the PT-RS with configured sequence index and in such a case, the sequence configuration information can be transmitted to the terminal device.

Hereinbefore, description is, made to operations related to the new RS solution at network side. Hereinafter, reference will be made to FIG. 17 to describe operations related to the new RS solution at terminal device side.

Figure 17:
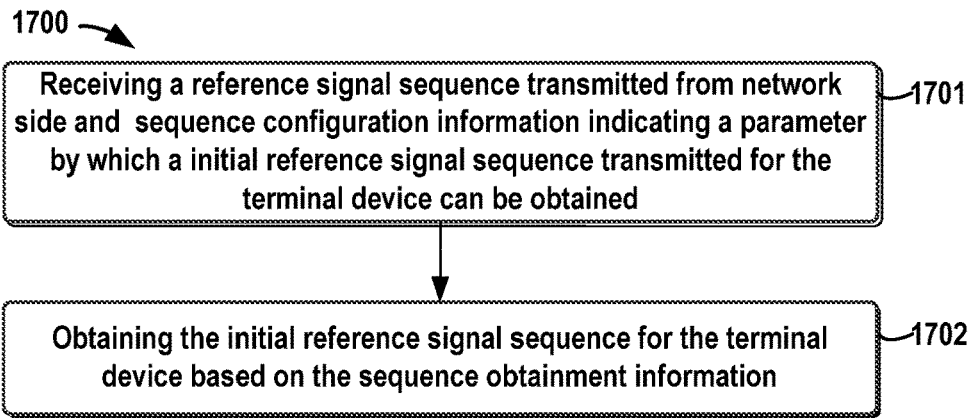
FIG. 17 schematically illustrates a flow chart of a method for reference signal receiving according to an embodiment of the present disclosure.

FIG. 17 further schematically illustrates a flow chart of method for reference signal receiving according to an example embodiment of the present disclosure. The method 1700 can be implemented at a terminal device, for example UE, or other like terminal devices.

As illustrated in FIG. 17, the method starts from step 1701, in which the terminal device like UE receives a reference signal sequence transmitted from network side and sequence configuration information indicating a parameter by which a reference signal sequence transmitted for the terminal device can be obtained.

In an embodiment of the present disclosure, the sequence configuration information can be explicit information which, for example, may comprise sequence position information indicating a position at which the reference signal sequence for the terminal device is located in the common reference signal sequence. As an example, the sequence position information may comprise any of: a start index and an end index of the reference signal sequence for the terminal device; a start index and the length of the reference signal sequence for the terminal device; an end index and the length of the reference signal sequence for the terminal device an offset value relative to the frequency configuration of the terminal device; and an offset value relative to a fixed frequency position.

In another embodiment of the present disclosure, the sequence configuration information can be implicit information which is, for example, indicated by other parameters including any of: boundaries/length of frequency band allocated to the terminal device; frequency band configuration of the terminal device; and a sequence generation initial value for the terminal device.

Next, at step 1702, an initial reference signal sequence for the terminal device can be obtained based on the sequence configuration information. At the terminal device, the terminal device may generate the common RS sequence in a similar way as those described with reference to FIGS. 4 to 16. Accordingly, the terminal device can abstract its initial RS sequence based on the sequence configuration information received in step 1702. Thus, the terminal device can know the initial RS sequence which does not undergo the channel between the serving node such as node B and the terminal device such as UE. By means of the initial RS sequence and the RS sequence that the terminal device at its allocated frequency band in step 702, it is possible to for example perform channel estimation or co-scheduling.

In an embodiment of the present disclosure, the obtaining the initial reference signal sequence for the terminal device may include obtaining the initial reference signal sequence for the terminal device based on the sequence configuration information and reference signal pattern for the terminal device. The reference signal pattern may include at least one of a reference signal density configuration in time domain, a reference signal density configuration in frequency domain and a reference signal frequency offset configuration.

Thus, with embodiments of the present disclosure, a reference signal sequence solution with a low complexity is proposed for the wireless communication system (especially for new radio access system) with dynamic bandwidth allocation and/or configurable reference signal pattern, wherein one common reference signal sequence can be generated and shared by at least some of terminal devices, irrespective of reference signal transmission configurations like bandwidth allocation and/or reference signal pattern configurations. Thus, it is possible to perform RS measurement and multi-user scheduling for UE even if they are configured different bandwidth allocation and/or configurable reference signal pattern. In addition, it can achieve better interference cancellation since reference signals from interfering cells will be easy to be obtained. Moreover, it only needs terminal devices to generate few (e.g. only one) common reference signal sequence for different band allocations and/or RS pattern configurations, which means a less complex solution.

Besides, in the present disclosure, there are also provided apparatuses for reference signal transmission and receiving at the serving node and terminal device in a wireless communication system respectively, which will be described next with reference to FIGS. 18 and 19.

Figure 18:
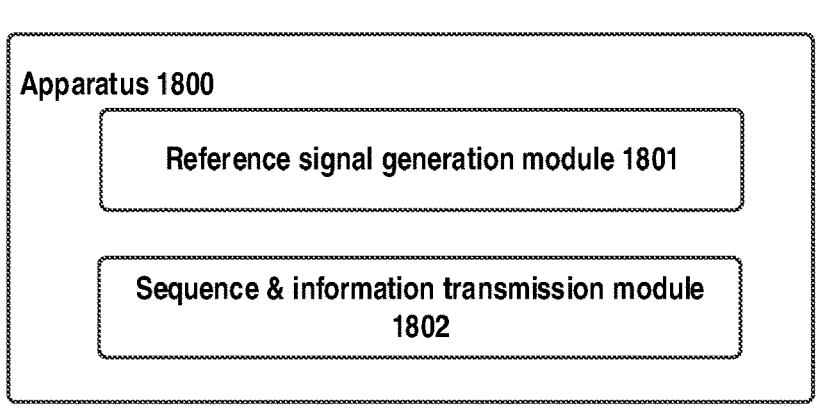
FIG. 18 schematically illustrates a block diagram of an apparatus for reference signal transmission according to an embodiment of the present disclosure.

FIG. 18 schematically illustrates a block diagram of an apparatus 1800 for reference signal transmission in a wireless communication system according to an embodiment of the present disclosure. The apparatus 1800 can be implemented at a serving node, for example a BS, like a node B (NodeB or NB).

As illustrated in FIG. 18, the apparatus 1800 may comprise a reference signal generation module 1801 and a sequence and information transmission module 1802. The reference signal generation module 1801 may be configured to generate, based on a frequency range configuration at network side, a common reference signal sequence shared by at least some of terminal devices respectively allocated with their own reference signal transmission configurations. The sequence and information transmission module 1802 may be configured to transmit the common reference signal sequence and sequence configuration information to a terminal device, the sequence configuration information indicating a parameter by which a reference signal sequence transmitted for the terminal device can be obtained.

In an embodiment of the present disclosure, the sequence configuration information may comprise sequence position information indicating a position at which the reference signal sequence for the terminal device is located in the common reference signal sequence.

In another embodiment of the present disclosure, the sequence position information may comprise any of: a start index and an end index of the reference signal sequence for the terminal device; a start index and the length of the reference signal sequence for the terminal device; an end index and the length of the reference signal sequence for the terminal device; an offset value relative to the frequency configuration of the terminal device and an offset value relative to a fixed frequency position.

In a further embodiment of the present disclosure, the sequence configuration information can be indicated by any of: boundaries/length of frequency band allocated to the terminal device; frequency band configuration of the terminal device; and a sequence generation initial value for the terminal device.

In a still further embodiment of the present disclosure, the frequency range configuration at network side may comprise any of the system bandwidth; and the frequency band configured for a node serving the terminal device.

In a yet further embodiment of the present disclosure, the reference signal transmission configurations comprise at least one of: bandwidth allocation; and a reference signal density configuration in time domain; reference signal density configuration in frequency domain; and a reference signal frequency offset configuration.

In another embodiment of the present disclosure, the reference signal generation module 1801 may be further configured to generate, for different frequency range configurations, the common reference signal sequence based on a frequency range covering all possible frequency ranges of the different frequency range configurations. The different frequency range configurations may have at least one of different subcarrier spacing configurations and different cyclic prefix configurations.

In a further embodiment of the present disclosure, the reference signal generation module 1801 may be further configured to generate the common reference signal sequence further based on a whole set of resource elements used for RS transmission in different reference signal configurations.

In a still further embodiment of the present disclosure, modulated symbols in the common reference signal sequence may vary by any of: a time-frequency block; a predetermined number of subcarriers in frequency domain; and a predetermined number symbols in time domain.

In a yet further embodiment of the present disclosure, modulated symbols in a reference signal sequence in a symbol may be generated based on those in a reference signal sequence in a previous symbol in a same frequency position.

In another embodiment of the present disclosure, the reference signal sequence in the symbol may have at least one of different densities and different frequency offsets from the reference signal sequence in the previous symbol.

Figure 19:
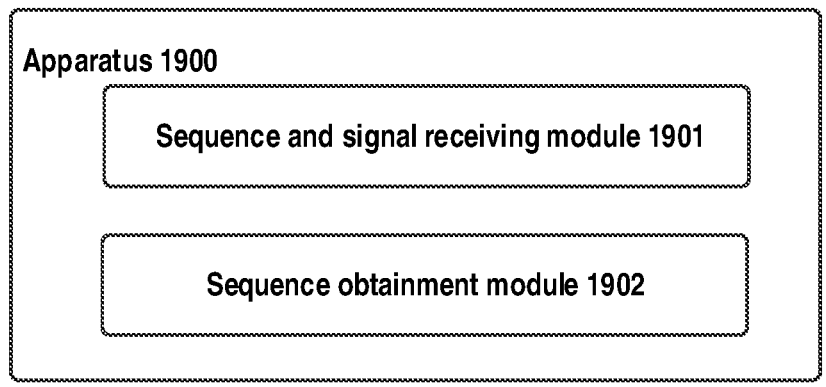
FIG. 19 schematically illustrates a block diagram of an apparatus for reference signal receiving according to an embodiment of the present disclosure.

FIG. 19 further schematically illustrates a block diagram of an apparatus 1900 for reference signal receiving in a wireless communication system according to an embodiment of the present disclosure. The apparatus 1900 can be implemented at a terminal device, for example UE, or other like terminal devices.

As illustrated in FIG. 19, the apparatus 1900 may include a sequence and signal receiving module 1901 and a sequence obtainment module 1902. The signal receiving module 1901 can be configured to receive a reference signal sequence transmitted from network side and sequence configuration information indicating a parameter by which a reference signal sequence transmitted for the terminal device can be obtained. The sequence obtainment module 1902 can be configured to obtain an initial reference signal sequence for the terminal device based on the sequence configuration information.

In an embodiment of the present disclosure, the sequence obtainment module 1902 may be further configured to: obtain the initial reference signal sequence for the terminal device based on the sequence configuration information and reference signal pattern for the terminal device.

Hereinbefore, the apparatuses 1800 and 1900 are described with reference to FIGS. 18 and 19. It is noted that the apparatuses 1800 and 1900 may be configured to implement functionalities as described with reference to FIGS. 4 to 17. Therefore, for details about the operations of modules in these apparatuses, one may refer to those descriptions made with respect to the respective steps of the methods with reference to FIGS. 4 to 17.

It is further noted that the components of the apparatuses 1800 and 1900 may be embodied in hardware, software, firmware, and/or any combination thereof. For example, the components of apparatuses 1800 and 1900 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, each of apparatuses 1800 and 1900 may comprise at least one processor. The at least one processor suitable for use with embodiments of the present disclosure may include, by way of example, both general and special purpose processors already known or developed in the future. Each of apparatuses 1800 and 1900 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1800 and 1900 to at least perform operations according to the method as discussed with reference to FIGS. 4 to 17 respectively.

Figure 20:
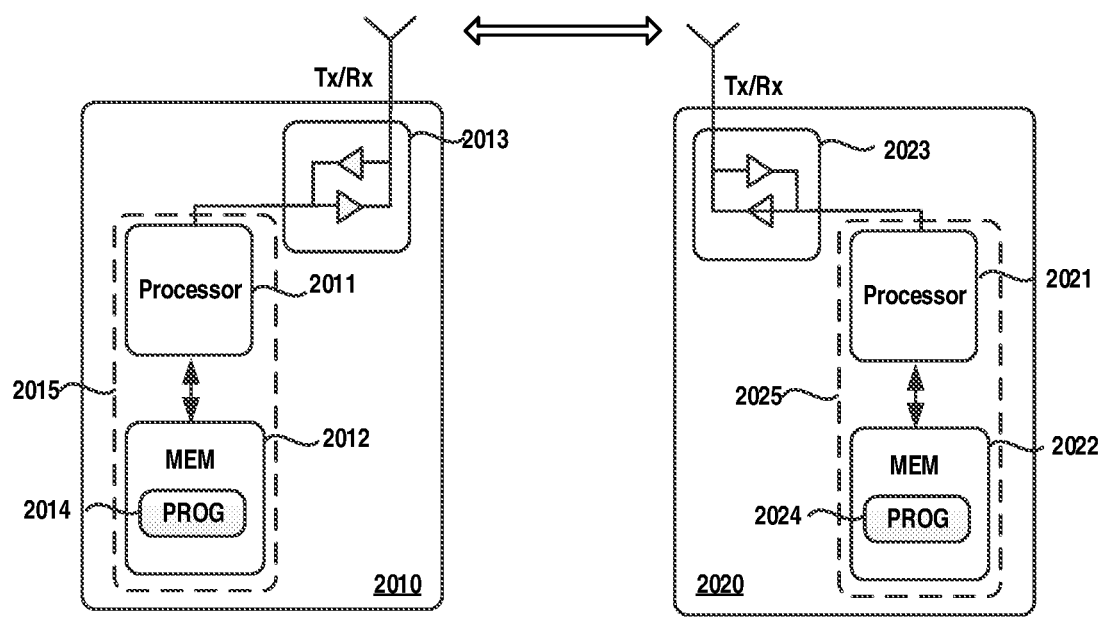
FIG. 20 further illustrates a simplified block diagram of an apparatus 2010 that may be embodied as or comprised in a serving node like a base station in a wireless network and an apparatus 2020 that may be embodied as or comprised in a terminal device like UE as described herein.

FIG. 20 further illustrates a simplified block diagram of an apparatus 2010 that may be embodied as or comprised in a serving node like a base station in a wireless network and an apparatus 2020 that may be embodied as or comprised in a terminal device like UE as described herein.

The apparatus 2010 comprises at least one processor 2011, such as a data processor (DP) and at least one memory (MEM) 2012 coupled to the processor 2011. The apparatus 2010 may further comprise a transmitter TX and receiver RX 2013 coupled to the processor 2011, which may be operable to communicatively connect to the apparatus 2020. The MEM 2012 stores a program (PROG) 2014. The PROG 2014 may include instructions that, when executed on the associated processor 2011, enable the apparatus 2010 to operate in accordance with embodiments of the present disclosure, for example the method 400. A combination of the at least one processor 2011 and the at least one MEM 2012 may form processing means 2015 adapted to implement various embodiments of the present disclosure.

The apparatus 2020 comprises at least one processor 2021, such as a DP, and at least one MEM 2022 coupled to the processor 2021. The apparatus 2020 may further comprise a suitable TX/RX 2023 coupled to the processor 2021, which may be operable for wireless communication with the apparatus 2010. The MEM 2022 stores a PROG 2024. The PROG 2024 may include instructions that, when executed on the associated processor 2021, enable the apparatus 2020 to operate in accordance with the embodiments of the present disclosure, for example to perform the method 1700. A combination of the at least one processor 2021 and the at least one MEM 2022 may form processing means 2025 adapted to implement various embodiments of the present disclosure.

Various embodiments of the present disclosure may be implemented by computer program executable by one or more of the processors 2011, 2021, software, firmware, hardware or in a combination thereof.

The MEMs 2012 and 2022 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2011 and 2021 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of a User Equipment (UE), the method comprising:
    generating a first sequence, for a Channel State Information Reference Signal (CSI-RS), the first sequence being mapped to a resource for the CSI-RS, the resource being configured within a UE-specific bandwidth, which is a part of a cell-specific bandwidth of a cell, the first sequence having at least two elements, each of the at least two elements having a respective index, each respective index being associated with a different one of respective indexes of second positions on the resource, the respective indexes of the second positions defined relative to a cell-specific position in a frequency domain,
        wherein the cell-specific position is common for each UE within the cell; and
    receiving the CSI-RS at the second positions.

2. The method according to claim 1, wherein the UE-specific bandwidth may overlap in the frequency domain with a UE-specific bandwidth configured for other UEs.

3. The method according to claim 1, wherein the first sequence corresponds to the UE-specific bandwidth.

4. The method according to claim 1, wherein the UE is capable of being scheduled within the UE-specific bandwidth.

5. The method according to claim 1, wherein a plurality of UEs are within the cell, and
    wherein each one of the plurality of UEs within the cell has a different UE-specific bandwidth.

6. A method of a base station, the method comprising:
    generating a first sequence, for a Channel State Information Reference Signal (CSI-RS), the first sequence being mapped to a resource for the CSI-RS, the resource being configured within a UE-specific bandwidth, which is part of a cell-specific bandwidth of a cell, the first sequence having at least two elements, each of the at least two elements having a respective index, each respective index being associated with a different one of respective indexes of second positions on the resource, the respective indexes of the second positions defined relative to a cell-specific position in a frequency domain,
        wherein the cell-specific position is common for each UE within the cell; and
    transmitting the CSI-RS at the second positions.

7. The method according to claim 6, wherein the UE-specific bandwidth may overlap in the frequency domain with a UE-specific bandwidth configured for other UEs.

8. The method according to claim 6, wherein the first sequence corresponds to the UE-specific bandwidth.

9. The method according to claim 6, wherein the base station is capable of performing scheduling within the UE-specific bandwidth.

10. The method according to claim 6, wherein a plurality of UEs are within the cell, and
wherein each one of the plurality of UEs within the cell has a different UE-specific bandwidth.

11. A User Equipment (UE), comprising:
a transceiver; and
a processor,
wherein the processor is configured to:
generate a first sequence, for a Channel State Information Reference Signal (CSI-RS), the first sequence being mapped to a resource for the CSI-RS, the resource being configured within a UE-specific bandwidth, which is a part of a cell-specific bandwidth of a cell, the first sequence having at least two elements, each of the at least two elements having a respective index, each respective index being associated with a different one of respective indexes of second positions on the resource, the respective indexes of the second positions defined relative to a cell-specific position in a frequency domain,
wherein the cell-specific position is common for each UE within the cell; and
control the transceiver to receive the CSI-RS at the second positions.

12. The UE according to claim 11, wherein the UE-specific bandwidth may overlap in the frequency domain with a UE-specific bandwidth configured for other UEs.

13. The UE according to claim 11, wherein the first sequence corresponds to the UE-specific bandwidth.

14. The UE according to claim 11, wherein the UE is capable of being scheduled within the UE-specific bandwidth.

15. The UE according to claim 11, wherein a plurality of UEs are within the cell, and
wherein each one of the plurality of UEs within the cell has a different UE-specific bandwidth.

16. A base station, comprising:
a transceiver; and
a processor,
wherein the processor is configured to:
generate a first sequence, for a Channel State Information Reference Signal (CSI-RS), the first sequence being mapped to a resource for the CSI-RS, the resource being configured within a UE-specific bandwidth, which is part of a cell-specific bandwidth of a cell, the first sequence having at least two elements, each of the at least two elements having a respective index, each respective index being associated with a different one of respective indexes of second positions on the resource, the respective indexes of the second positions defined relative to a cell-specific position in a frequency domain,
wherein the cell-specific position is common for each UE within the cell; and
control the transceiver to transmit the CSI-RS at the second positions.

17. The base station according to claim 16, wherein the UE-specific bandwidth may overlap in the frequency domain with a UE-specific bandwidth configured for other UEs.

18. The base station according to claim 16, wherein the first sequence corresponds to the UE-specific bandwidth.

19. The base station according to claim 16, wherein the UE is capable of being scheduled within the UE-specific bandwidth.

20. The base station according to claim 16, wherein a plurality of UEs are within the cell, and
wherein each one of the plurality of UEs within the cell has a different UE-specific bandwidth.

\* \* \* \* \*